(12) United States Patent
Corbeil et al.

(10) Patent No.: US 6,999,678 B2
(45) Date of Patent: Feb. 14, 2006

(54) ADAPTIVE METHOD FOR CHIRPING AN OPTICAL DATA SIGNAL

(75) Inventors: Sacha Corbeil, Ottawa (CA); Rajkumar Nagarajan, Ottawa (CA); Ross Saunders, Ottawa (CA)

(73) Assignee: PTS Corporation, San Jose, CA (US)

( * ) Notice: Subject to any disclaimer, the term of this patent is extended or adjusted under 35 U.S.C. 154(b) by 781 days.

(21) Appl. No.: 10/004,200

(22) Filed: Nov. 1, 2001

(65) Prior Publication Data

US 2003/0081277 A1 May 1, 2003

(51) Int. Cl.
*G02F 1/00* (2006.01)
*H04J 14/00* (2006.01)
*H04B 10/12* (2006.01)

(52) U.S. Cl. .............................. 398/5; 398/43; 398/193; 398/199

(58) Field of Classification Search .................. 398/26, 398/27, 30, 155, 158, 162, 182, 192, 193, 398/195, 199
See application file for complete search history.

(56) References Cited

U.S. PATENT DOCUMENTS

| | | | |
|---|---|---|---|
| 4,817,207 A | 3/1989 | Smith et al. | |
| 5,408,544 A | 4/1995 | Seino | |
| 5,526,162 A | 6/1996 | Bergano | |
| 5,835,212 A | 11/1998 | Kissa et al. | |
| 5,896,391 A | 4/1999 | Solheim et al. | |
| 5,912,755 A | 6/1999 | Bergano | |
| 6,057,950 A | 5/2000 | Bergano | |
| 6,239,897 B1 | 5/2001 | Jackson | |
| 6,307,655 B1 | 10/2001 | Jelks | |
| 6,583,910 B1 * | 6/2003 | Satoh | 398/182 |
| 6,742,154 B1 * | 5/2004 | Barnard | 714/752 |
| 6,791,388 B2 * | 9/2004 | Buchwald et al. | 327/248 |

* cited by examiner

*Primary Examiner*—M. R. Sedighian
*Assistant Examiner*—David Lee
(74) *Attorney, Agent, or Firm*—Harness, Dickey & Pierce, P.L.C.

(57) ABSTRACT

An adaptive method is provided for applying chirp to an optical signal traversing through an optical network. The adaptive method comprises: applying chirp to an optical data signal at a transmitter in the optical network; transmitting the optical data signal through the optical network, the optical data signal having error detection data embedded therein; determining an error rate for the optical data signal at an egress point of the optical network, where the error rate is based on the error detection data embedded in the optical data signal; transmitting the error rate for the optical data signal to the transmitter; and adjusting the chirp being applied to the optical data signal at the transmitter based on the error rate for the optical data signal.

11 Claims, 6 Drawing Sheets

ADAPTIVE METHOD FOR CHIRPING AN OPTICAL DATA SIGNAL

FIELD OF THE INVENTION

The present invention relates generally to chirping an optical data signal, more particularly, to an adaptive method for chirping an optical data signal based on error rate feedback associated with the optical data signal.

BACKGROUND OF THE INVENTION

Fiber optic communications requires at minimum a transmitter, a propagation medium, and a receiver. The transmitter sends a lightwave signal, containing the data that requires transmission, down the medium. The medium itself consists of optical fiber, as well as optical filters, amplifiers, attenuators, and other devices. The receiver at the far end of the medium converts the optical signal into an electrical signal suitable for devices with which it will interface (e.g., routers, switches, etc).

The most common optical transmission format for digital data in long haul optical networks consists of binary intensity modulation. In this format, a logical "1" corresponds to a pulse of light, while a logical "0" corresponds to the absence of a pulse. The pulses are sent sequentially, at a pre-determined bit-rate. The bit period, or time duration between two consecutive "1" pulses, must be equal to or larger than the pulse width.

Due to dispersion in the medium, pulses tend to broaden over propagation. Without dispersion compensation, the pulse width (in units of time) would lengthen to the point where two consecutive pulses start to interfere with each other. In other words, the pulse-duration grows longer than the bit-period. Chirping a pulse is one known technique for controlling dispersion of an optical signal.

"Chirping" a pulse is inducing a phase modulation in parallel with the intensity modulation. FIG. 1 illustrates the light source frequency, modulated by a pulse shape at a lower frequency, at 2. The envelope shown at 4 is what is "intensity modulated", and represents the variation of the optical power in time. The additional phase-modulation or chirp is shown at 6. This phase delta would be added to the periodic waveform shown at 2. In the illustration, the phase modulation is shown to be ideally synchronized with the intensity modulation (peaks of 6 align with peaks of 4) for positive chirping. Negative chirping would require aligning the peaks of 4 with the valleys of 6. Shifting the chirp to the left or right would constitute non-ideal synchronization.

FIG. 2 illustrates the broadening of the pulse width as a function of dispersion and chirping. In the case of a pre-chirped pulse (i.e., chirped at the transmitter), the broadening of the pulse is modified. With the appropriate sign of chirp, the pulse will actually start to compress, reach a minimum width, and then broaden again as it traverses through the network. This effect can reduce the amount of dispersion compensation required. The amplitude of the phase modulation governs how much the bit will be compressed, while the appropriate synchronization depends on the net sign of dispersion throughout the propagation medium as is well known in the art.

Pre-chirp is often applied at a fixed amplitude: either by external, finite-chirp, data modulators (chirp is intrinsic to the intensity modulation), by direct-modulated lasers, or by external phase modulators. Typically, a fixed amplitude of pre-chirp is determined at design time, such that it will cover a large range of dispersion values. To maintain the amplitude, a peak detector can be used, which assumes fixed characteristics of the optical transfer function over lifetime and temperature. However, the performance of the communication link could be improved by optimizing the chirp for transient network conditions.

When pre-chirp is applied with an external phase-modulator, it is very easy to adjust the amplitude of the chirp. Therefore, it is desirable to provide an adaptive method for determining and controlling the ideal chirp amplitude applied to an optical signal.

SUMMARY OF THE INVENTION

In accordance with the present invention, an adaptive method is provided for applying chirp to an optical signal traversing through an optical network. The adaptive method comprises: applying chirp to an optical data signal at a transmitter in the optical network; transmitting the optical data signal through the optical network, the optical data signal having error detection data embedded therein; determining an error rate for the optical data signal at an egress point of the optical network, where the error rate is based on the error detection data embedded in the optical data signal; transmitting the error rate for the optical data signal to the transmitter; and adjusting the chirp being applied to the optical data signal at the transmitter based on the error rate for the optical data signal.

For a more complete understanding of the invention, its objects and advantages, reference may be had to the following specification and to the accompanying drawings.

DETAILED DESCRIPTION OF THE PREFERRED EMBODIMENTS

Figure 1:
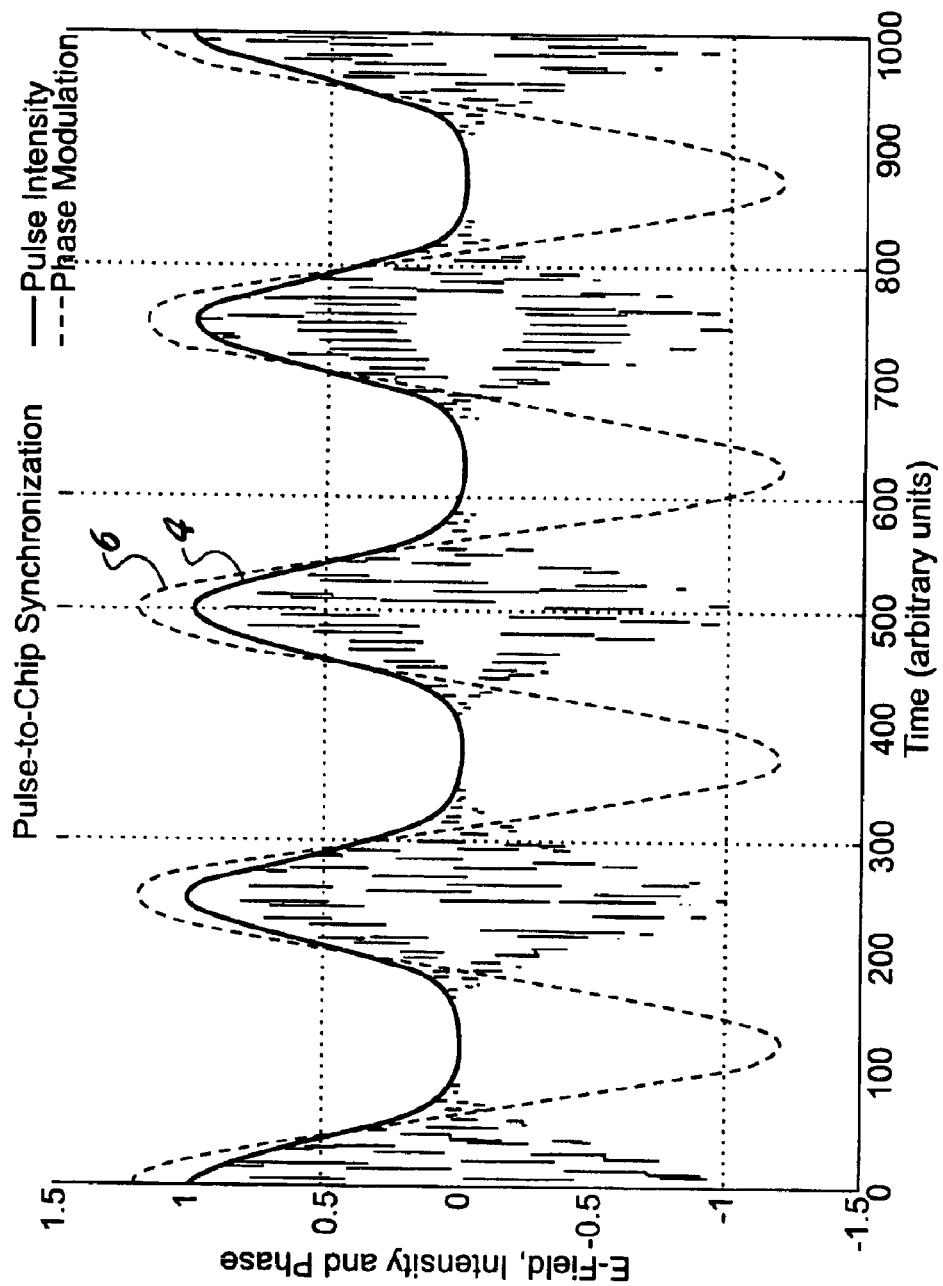
FIG. 1 is a graph illustrating how chirp may be synchronized the light pulses of an optical data signal.
Figure 2:
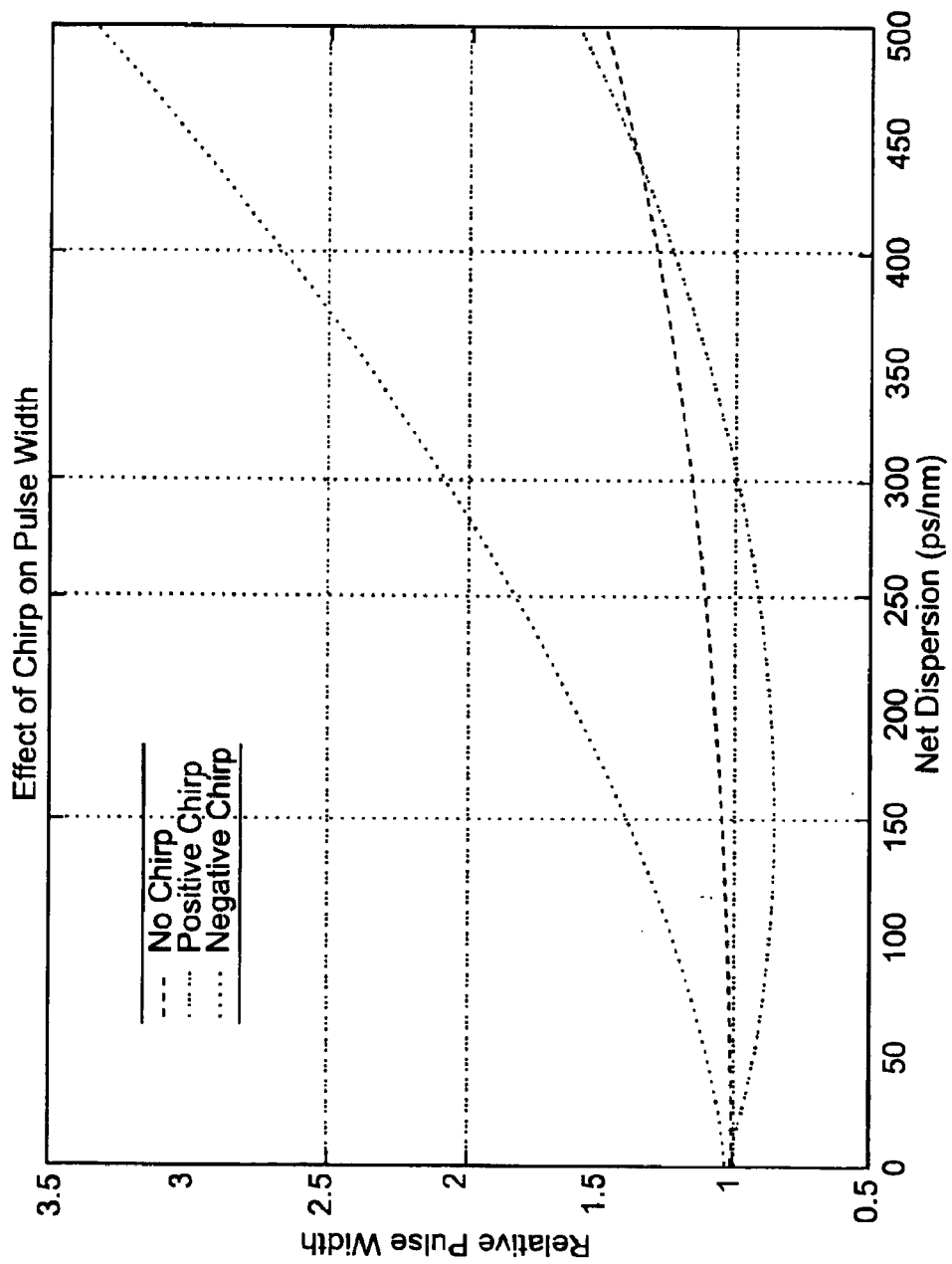
FIG. 2 is a graph illustrating the effect of chirp on the pulse width of an optical data signal.
Figure 3:
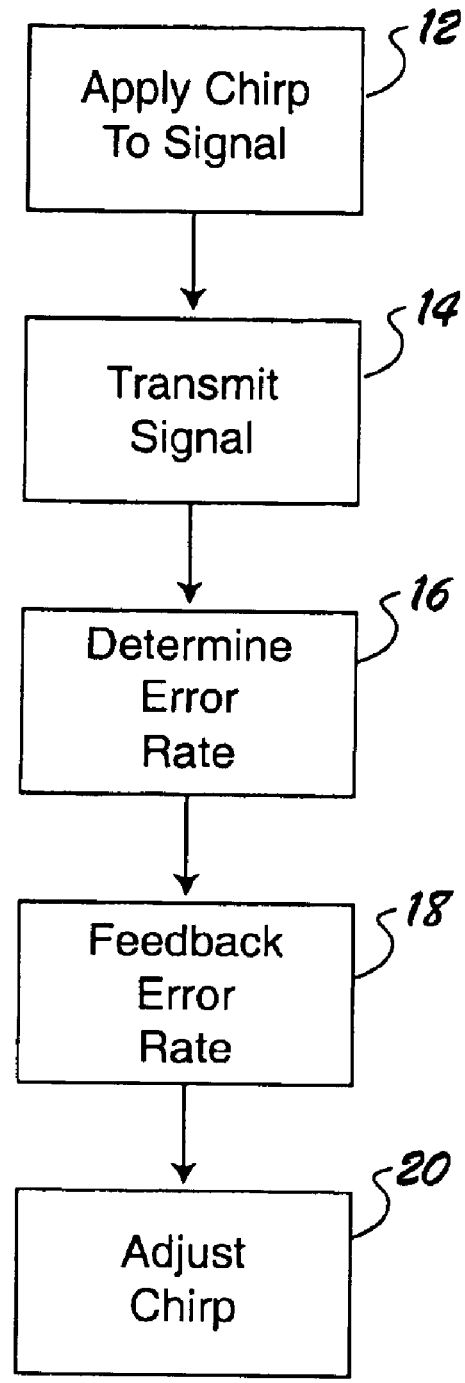
FIG. 3 is a flowchart depicting an adaptive method for applying chirp to an optical signal in accordance with the present invention.

An adaptive method 10 for applying chirp to an optical signal traversing through an optical network is shown in FIG. 3. Chirp is applied at step 12 to an optical data signal at a transmitter residing in the optical network. The optical data signal, including error detection data embedded therein, is then transmitted over the optical network to a receiver as shown at step 14.

At step 16, an error rate is determined for the optical data signal at the receiver based on the error detection data embedded in the optical data signal as is well known in the art. For example, error detection data may be embedded in the B1 byte of an optical data frame in accordance with the SONET communication protocol. The error correction data may then be used to calculate a bit error rate (BER) for the optical data signal. Alternatively, when using a forward error correction scheme, the corrected error rate may be used as an indication of the error rate for the optical data signal. It is envisioned that other schemes may be used to provide an indication of the error rate of the optical signal.

The error rate for the optical data signal is in turn transmitted back to the transmitter at step 18. Since the ideal chirp directly correlates to the error rate associated with the optical data signal, the chirp being applied to the optical data signal at the transmitter may be adjusted based on the error rate for the optical data signal as shown at step 20. In this way, the adaptive method of the present invention is able to determine and control the ideal chirp applied to the optical data signal.

Figure 4:
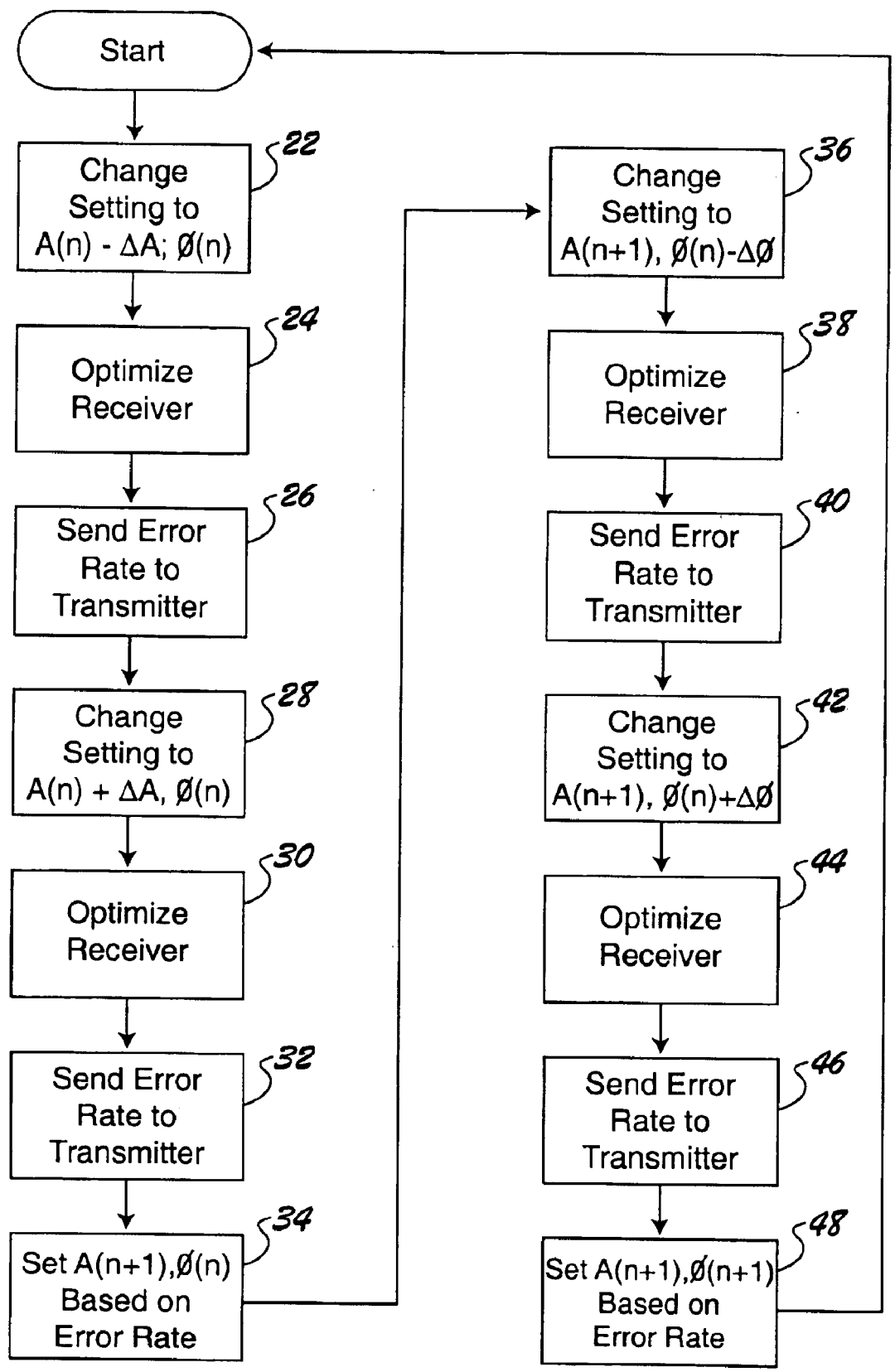
FIG. 4 is a flowchart depicting a preferred embodiment of the adaptive methodology in accordance with the present invention.

A preferred implementation of the adaptive methodology of the present invention is depicted in FIG. 4. In an initial state, the transmitter is transmitting an optical data signal having a fixed chirp setting across the optical network at step 22. For illustration purposes, the fixed chirp setting is designated by an amplitude $A(n)$ and a phase offset $\phi(n)$. As will be further described below, the chirp being applied to the optical data signal is adaptively controlled by dithering the chirp and using feedback error control to minimize the error rate experienced by optical data signal at the receiver.

Figure 5A:
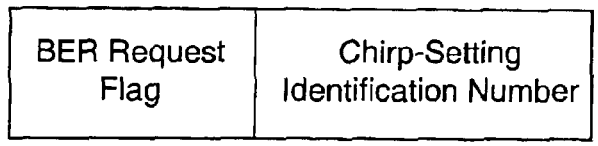
FIGS. 5A and 5B illustrate an exemplary error rate request message format and an exemplary error rate reply message format, respectively, in accordance with the present invention.

In the preferred embodiment, the transmitter alternates between dithering the amplitude of the chirp and dithering the phase offset of the chirp. First, the transmitter changes the chirp amplitude setting to $A(n)-\Delta A$ at step 22. The transmitter may also send an error rate request message to the receiver. An exemplary message format is shown in FIG. 5A.

In response to the error rate request message, the receiver preferably optimizes data recovery in view of the dithered transmitter setting at step 24. However, it is envisioned that optimizing data recovery at the receiver may not be triggered by an error rate request message. Alternatively, the adjustments to the chirp setting made by the transmitter and optimization of data recovery at the receiver may be in accordance with a predetermined and/or periodic timeframe. Techniques for optimizing data recovery at a receiver are well known in the art.

Figure 5B:
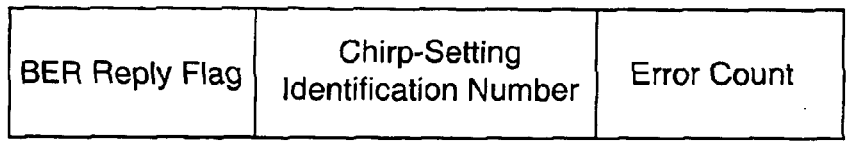

Once an optimal bit error rate is achieved for the current transmitter setting, the receiver sends an error rate reply message to the transmitter at step 26. The error rate reply message contains the optimal error rate, $BER_{A-}$, achieved by the receiver as shown in the exemplary message format in FIG. 5B.

Next, the transmitter changes the chirp amplitude setting to $A(n)+\Delta A$ at step 28. The transmitter may again send an error rate request message to the receiver. In response to the error rate request message, the receiver preferably optimizes data recovery in view of the dithered transmitter setting at step 30. Once an optimal bit error rate is achieved the current transmitter setting, the receiver sends an error rate reply message, including the optical error rate, $BER_{A+}$, to the transmitter at step 32.

Feedback error control is then employed by the transmitter to optimize the chirp amplitude setting at step 34. The general control principle is to minimize the error rate experienced at the receiver by adjusting the chirp settings. A PID control approach is preferably used to minimize the error rate, where the error function for the control loop is $err_A(n)=(BER_{A+}-BER_{A-})$. In this case, the transmitter sets the chirp amplitude to $A(n+1)=PID_A(err_A(n))$, where the control loop is implemented via a controller. The PID can be a simple integrator such as $PID_A=A(n)+k_A err_A(n)$ and $k_A<0$ in order to converge the error rate to a minimum value. Although a PID control approach is presently preferred, it is envisioned that other control schemes are also within the broader aspects of the present invention. In this way, the amplitude of the chirp being applied to the optical data signal at the transmitter is adjusted based on the error rate of the optical data signal at the receiver.

Phase offset of the chirp is dithered in a similar manner. The transmitter changes the chirp phase offset to $\phi(n)-\Delta\phi$ at step 36. The transmitter then sends an error rate request message to the receiver. In response to the error rate request message, the receiver preferably optimizes data recovery in view of the dithered transmitter setting at step 38. Once an optimal bit error rate is achieved for the current transmitter setting, the receiver sends an error rate reply message, including the optical error rate, to the transmitter at step 40.

Next, the transmitter changes the chirp amplitude setting to $\phi(n)+\Delta\phi$ at step 42. The transmitter again sends an error rate request message to the receiver. In response to the error rate request message, the receiver preferably optimizes data recovery in view of the dithered transmitter setting at step 44. Once an optimal bit error rate is achieved at the receiver, the receiver sends an error rate reply message, including the optical error rate, to the transmitter at step 46. Lastly, the phase offset of the chirp being applied to the optical data signal at the transmitter is adjusted at step 48 based on the error rate of the optical data signal using a PID control approach as set forth above. The adaptive methodology of the present invention may be continually or periodically repeated to achieve optimal results.

Figure 6:
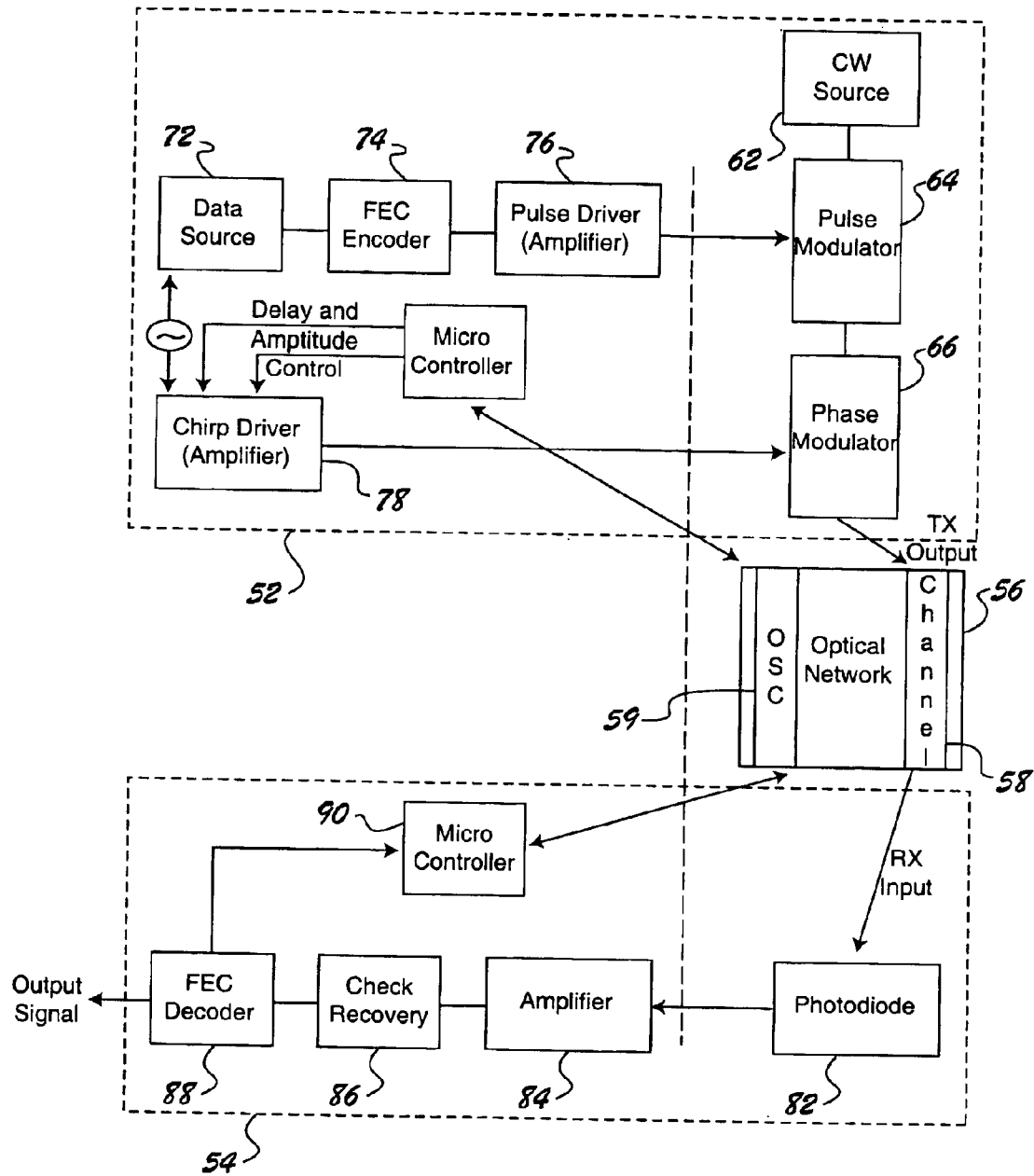
FIG. 6 is a block diagram of an exemplary chirp system that is integrated into an optical network in accordance with the present invention.

FIG. 6 illustrates an exemplary adaptive chirp system 50 that is integrated into an optical network. The optical network includes a transmitter subsystem 52 and a receiver subsystem 54 interconnected by an optical fiber medium 56. While the following description is provided with reference to a specific embodiment, it is readily understood that other configurations may be suitably used to implement the adaptive methodology of the present invention.

In this embodiment, the transmitter subsystem 52 is comprised of a continuous wave light source 62 connected in series to a pulse modulator 64 and a phase modulator 66. The pulse modulator 64 is in turn driven by a data source 72, a forward error correction encoder 74 and a pulse driver 76 as is well known in the art. In operation, the pulse modulator 64 generates a series of light pulses by intensity modulating the continuous lightwave from the wave light source 62, thereby generating an optical data signal. The phase modulator 66 is driven by a chirp driver 78. The phase modulator is operable to phase modulate the series of light pulses received from the pulse modulator 64, and thus capable of applying chirp to the optical data signal.

A microcontroller 80 is interposed between the pulse driver 72 and the chirp driver 78. The microcontroller 80 controls the amplitude and delay-offset settings that are applied to the chirp driver 78. In this way, the microcontroller 80 governs the amplitude of the chirp applied to the optical data signal by the phase modulator as well as the synchronization between pulse modulation and phase modulation. In other words, the microcontroller 80 is operable to set and adjust the chirp being applied to the optical data signal at the transmitter.

The resulting optical data signal is carried by a fiber optic medium 56 from the transmitter subsystem 52 to the receiver subsystem 54. In particular, the total optical bandwidth carried by the fiber optic medium 56 may be partitioned into one or more optical data (or payload) channels 58 and at least one optical supervisory (or service) channel 59. In this case, the optical data signals are carried by the payload portion of the optical bandwidth.

The receiver subsystem 54 is comprised of a photodiode 82. The photodiode 82 is in turn connected to an amplifier 84, a clock/data recovery block 86, and a forward error correction decoder 88 as is well known in the art. In operation, the receiver system 54 is operable to receive the optical data signal and convert the optical signal into an electrical output signal suitable for use by other devices in the system. In addition, the forward error correction decoder 86 is further operable to determine an error rate for the optical data signal.

The receiver subsystem 54 further includes a microcontroller 90. The microcontroller 90 receives the detected error rate from the forward error correction decoder 88 and is operable to transmit the error rate for the optical data signal back to the transmitter subsystem 52. In particular, the error rate is transmitted to the microcontroller 80 residing in the transmitter subsystem. The microcontroller 80 is then able to adjust the chirp being applied to the optical data signal based on the error rate as described above. In a preferred embodiment, the error rate is transmitted via the supervisory channel 59 residing in the optical fiber medium. In this embodiment, each microcontroller 80 and 90 has send and receive access via the electrical backplane to the optical supervisory channel 59. However, it is also envisioned that the error rate may also be transmitted using a wayside data communication system that is independent from the optical network, or using a dedicated data channel embedded in the FEC overhead of the optical data channel, traveling in the opposite direction.

While the invention has been described in its presently preferred form, it will be understood that the invention is capable of modification without departing from the spirit of the invention as set forth in the appended claims.

What is claimed is:

1. An adaptive method for applying chirp to an optical signal traversing through an optical network, comprising:
    applying chirp to an optical data signal at a transmitter in the optical network;
    transmitting the optical data signal through the optical network, the optical data signal having error detection data embedded therein;
    optimizing data recovery from the optical data signal at an egress point of the optical network prior to determining an error rate for the optical data signal;
    determining the error rate for the optical data signal at the egress point of the optical network, where the error rate is based on the error detection data embedded in the optical data signal;
    transmitting the error rate for the optical data signal to the transmitter; and
    adjusting the chirp being applied to the optical data signal at the transmitter based on the error rate for the optical data signal.

2. The method of claim 1 wherein the step of applying chirp to an optical data signal further comprises using an external phase modulator.

3. The method of claim 1 wherein the step of applying chirp to an optical data signal further comprises dithering amplitude of the chirp applied to the optical data signal.

4. The method of claim 3 wherein the step of adjusting the chirp further comprises using feedback error control to minimize the error rate detected at the egress point.

5. The method of claim 1 wherein the step of applying chirp to an optical data signal further comprises dithering phase of the chirp applied to the optical data signal.

6. The method of claim 5 wherein the step of adjusting the chirp further comprises minimizing the error rate detected at the egress point through the use of feedback error control.

7. The method of claim 1 wherein the step of determining an error rate further comprises deriving the error rate from the number of corrected errors in a forward error correction scheme.

8. The method of claim 1 wherein the step of transmitting the error rate for the optical data signal further comprises using an optical supervisory channel to transmit the error rate.

9. An adaptive method for applying chirp to an optical signal traversing through an optical network, comprising:
    applying chirp to an optical data signal at a transmitter in the optical network, the optical data signal having error detection data embedded therein;
    dithering one of amplitude and phase of the chirp being applied to the optical data signal;
    optimizing data recovery from the optical data signal at an egress point of the optical network;
    determining an error rate for the optical data signal at the egress point of the optical network, where the error rate is based on the error detection data embedded in the optical data signal;
    transmitting the error rate for the optical data signal to the transmitter; and
    adjusting the chirp being applied to the optical data signal at the transmitter based on the error rate for the optical data signal
    dithering the other of amplitude and phase of the chirp being applied to the optical data signal;
    optimizing data recovery from the optical data signal at the egress point of the optical network;
    determining an error rate for the optical data signal at the egress point of the optical network;
    transmitting the error rate for the optical data signal to the transmitter; and
    adjusting the chirp being applied to the optical data signal at the transmitter based on the error rate for the optical data signal.

10. The method of claim 9 wherein the step of transmitting the error rate for the optical data signal further comprises using an optical supervisory channel to transmit the error rate.

11. The method of claim 9 wherein the step of adjusting the chirp further comprises using feedback error control to minimize the error rate detected at the egress point.

* * * * *